(12) United States Patent
Subramanian

(10) Patent No.: US 12,451,897 B1
(45) Date of Patent: Oct. 21, 2025

(54) CAP-RAM ADC SHARING

(71) Applicant: Krishnamurthy Subramanian, Saratoga, CA (US)

(72) Inventor: Krishnamurthy Subramanian, Saratoga, CA (US)

(73) Assignee: PIMIC, Cupertino, CA (US)

( * ) Notice: Subject to any disclaimer, the term of this patent is extended or adjusted under 35 U.S.C. 154(b) by 260 days.

(21) Appl. No.: 18/385,236

(22) Filed: Oct. 30, 2023

Related U.S. Application Data

(60) Provisional application No. 63/438,040, filed on Jan. 10, 2023, provisional application No. 63/420,794, filed on Oct. 31, 2022.

(51) Int. Cl.
*H03M 1/12* (2006.01)
*G11C 7/16* (2006.01)

(52) U.S. Cl.
CPC ............. *H03M 1/1245* (2013.01); *G11C 7/16* (2013.01)

(58) Field of Classification Search
CPC .......... H03M 1/1245; G11C 7/00; G11C 7/16; G11C 11/413; G11C 11/412
USPC ........................................................ 341/155
See application file for complete search history.

(56) References Cited

U.S. PATENT DOCUMENTS

2023/0370082 A1* 11/2023 Lee ...................... G11C 11/412

* cited by examiner

*Primary Examiner* — Peguy Jean Pierre
(74) *Attorney, Agent, or Firm* — Robert Schuler

(57) ABSTRACT

A neural network architecture has a plurality of nodes, with each node being implemented in a CAP-RAM macro comprised of two or more rows of 6T-cell clusters. An analog voltage level present on each row can be sampled by an analog-to-digital converter (ADC) which sends a voltage value, in digital form, to a digital periphery. A first input to each of the ADCs is connected to an output line of a first CAP-RAM that is currently active, and a second ADC input is connected to an output of a second CAP-RAM that is in retention mode. Each ADC operates to sample an analog voltage level on an output line associate with the one CAP-RAM that is currently active.

17 Claims, 5 Drawing Sheets

CAP-RAM ADC SHARING

1. FIELD OF THE INVENTION

The present disclosure relates to the operation of an analog-to-digital converter in association with a CAP-RAM macro architecture during an inter-memory-computation operation.

2. BACKGROUND

Artificial intelligence (AI) applications are typically memory intensive, and are generally implemented in conjunction with a convolutional neural network. For an AI application to operate efficiently, it is necessary to implement the neural network to have a comparatively large # of neurons (i.e., a large array of static random-access memory (SRAM) cells). Neural networks of this size can require a large amount of power and have a relatively large form factor. In order to mitigate the power needed to run such neural networks, in-memory computing (IMC) techniques have been designed to limit the movement of data between a compute function and memory. In order to further mitigate the power-cost to run a neural network, different types of analogy domain IMC techniques have been implemented that are both computationally fast and energy efficient. One such memory architecture being proposed is a Charge-Domain In-Memory Computing 6T-SRAM (CAP-RAM). The design and operation of a CAP-RAM macro is described in a paper published by the IEEE in 2021 under the title "CAP-RAM: A Charge-Domain In-Memory Computing 6T-SRAM for Accurate and Precision-Programmable CNN Inference". A charge-domain IMC circuit is also disclosed in a published PCT application number WO 2022/192744A1.

3. BRIEF DESCRIPTION OF THE DRAWINGS

4. DETAILED DESCRIPTION

Figures 1A, 1B:
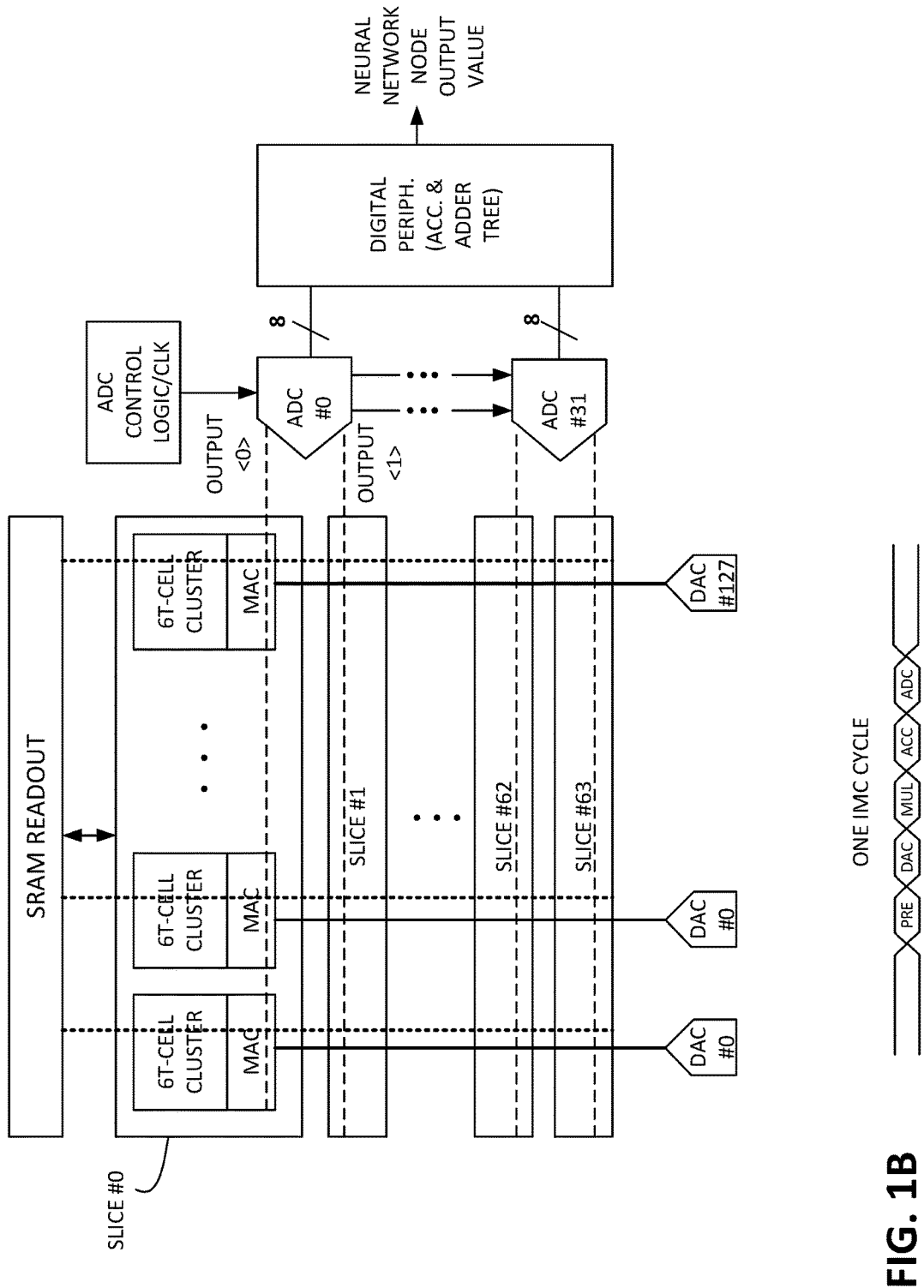
FIG. 1A is a diagram showing functional elements comprising a prior art CAP-RAM circuit.
FIG. 1B is a phase diagram of an IMC cycle corresponding to the CAP-RAM in FIG. 1A.

FIG. 1A illustrates a prior art CAP-RAM (CR) macro that is described in detail in the IEEE paper referenced earlier that was published in 2021 and entitled, "CAP-RAM: A Charge-Domain In-Memory Computing 6T-SRAM for Accurate and Precision-Programmable CNN Inference" and so will not be described here in detail. Generally, the CP macro described in the paper supports inter-memory computing (IMC) supports convolution implemented in a multiply-and-accumulate (MAC) step. The CR in FIG. 1 shows a MAC associated with each 6T-cluster that operates to multiply a weight by an analog value received from each DAC, and a resultant charge is maintained on capacitors comprising each cluster to be sampled by an ADC associated with each slice. The output of each ADC is sent to an adder tree comprising digital periphery functionality which operates to shift and add the partial sums sampled by the ADC. FIG. 1B illustrates phases comprising one IMC cycle, which includes a pre-charge phase, a DAC phase, a multiply phase, an accumulator phase, and an ADC phase. The operation of each phase during an IMC cycle is well known to those practiced in IMC design, and so will not be described here in any detail.

As described earlier, the CR circuit describe with reference to FIG. 1A efficiently enables IMC operations, however in order to further mitigate the energy budget needed to operate a CAP-RAM (CR) circuit, and to mitigate the overall size of the prior art CAP-RAM macro, I have designed an improved architecture for a CR macro that has fewer instances of ADC functionality and which utilizes each ADC more efficiently.

According to one embodiment, each of a plurality of ADC instances can be controlled to sample the capacitive charge on 6T-cells comprising more than one CR macro.

According to another embodiment, one ADC can be controlled to sample the capacitive charge on 6T-cells comprising one CR macro.

According to yet another embodiment, one ADC can be controlled to sample the capacitive charge on 6T-cells comprising more than one CR macro.

Figure 2A:
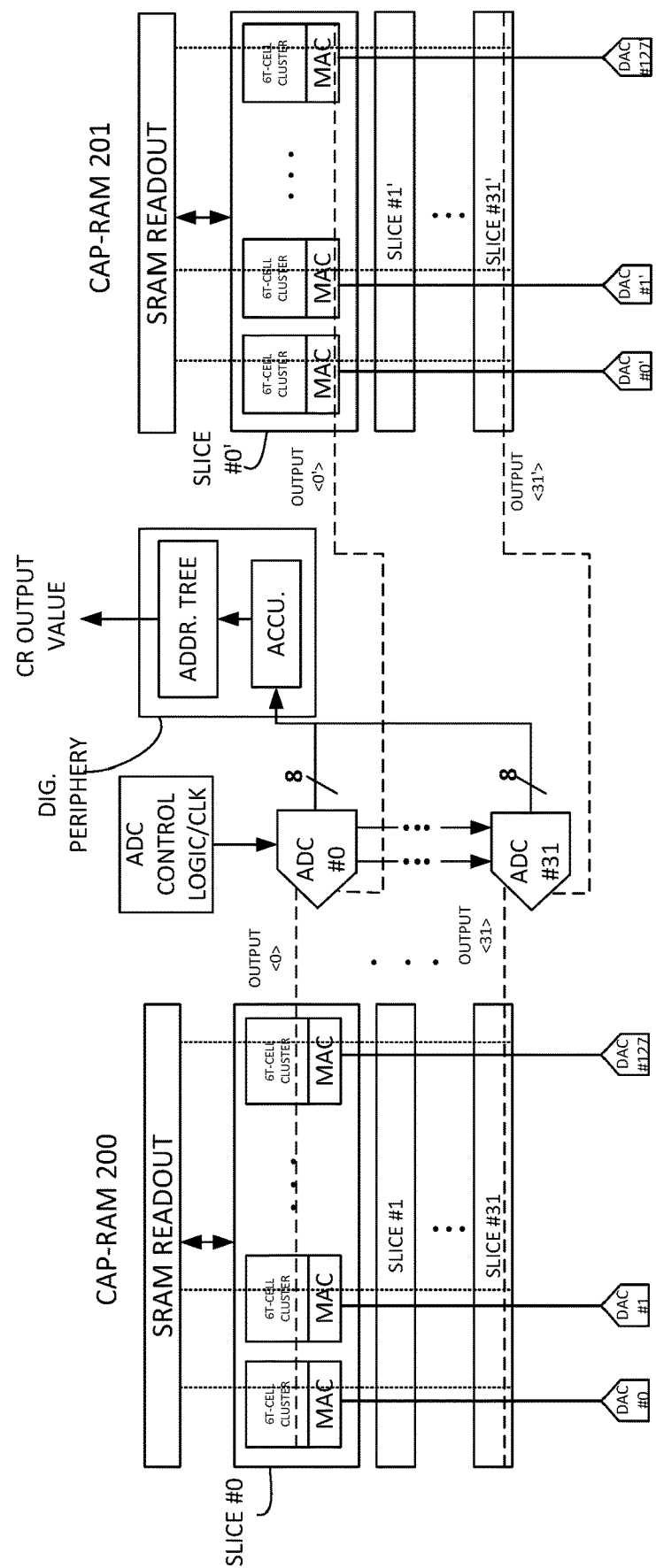
FIG. 2A is a diagram showing functional elements comprising one embodiment with a plurality of ADCs being shared between two CAP-RAM macros.

The above and other embodiments of my design will now be described with reference to the drawings, in which FIG. 2A illustrates two CR macros 200 and 201, both of which comprise the same functional elements shown with reference to FIG. 1. According to the embodiment in FIG. 2A each one of a plurality of ADC instances are shared between two CRs 200 and 201. Each of the CRs, in this case, are comprised of thirty-two slices or rows of 6T-cell clusters, with each row having one-hundred and twenty-eight clusters. Further, FIG. 2A shows that a first differential input to each one of the thirty-two ADC instances is connected to an output line associated with a row of cell clusters comprising the CR 200, and a second differential input to each one of the thirty-two ADC instances is connected to an output line associated with a row of cell cluster comprising the CR 201. It should be understood that while the embodiment illustrated in FIG. 2A has a particular number of rows and clusters per row, this is not a limiting feature of the embodiment.

With continued reference to FIG. 2A, during a first period of time, either CR 200 or CR 201 can be used for in-memory-computing (IMC) (i.e., the CR as active). IMC is characterized by a four-phase operation that includes a reset phase, a DAC phase, a multiplication phase, and an accumulation phase. When the IMC operation running on an active CR is completed, the ADC connected to each output line proceeds to sample an analog voltage present on that line and converts this voltage to a digital value, which in this case is an 8-bit word that is sent to a digital periphery having accumulator and adder tree functionality. The digital value output of each ADC is processed by the periphery functionality, and the resulting value represents the output of the neural network node/CR that can be passed to another NN node.

Continuing to refer to FIG. 2A, during the period of time that the CR 200 is used for IMC, the other CR 201 can be in a lower powered state (i.e., retention mode). Then, during a next period of time, the CR201 can be powered up to become active and available to perform an IMC operation. As shown in FIG. 2A, each of a second differential input associated with the plurality of ADCs are connected to each row of 6T-cell clusters in the CR201. When the CR201 is powered, an IMC process can be initiated in the CR201, and each of the plurality of the ADCs connected to the CR201 can sample a voltage at the output lines after the accumulator phase for each row is complete. According to the embodiment described with reference to FIG. 2A, each ADC is shared between two CRs, however, it should be understood that this method is not limited to only sharing and ADC between two CRs, but the same methodology can be employed to share an ADC between three or more CRs as well. Implementing a neural network according to this embodiment reduces the area in memory needed for the ADC operation by illuminating half of the ADCs that would otherwise be fabricated in the memory device. Further, the power budget or power domains needed to drive ADCs is reduced. Still further, the area savings could allow higher quality ADCs (higher bit resolution) can be utilized.

Figure 2B:
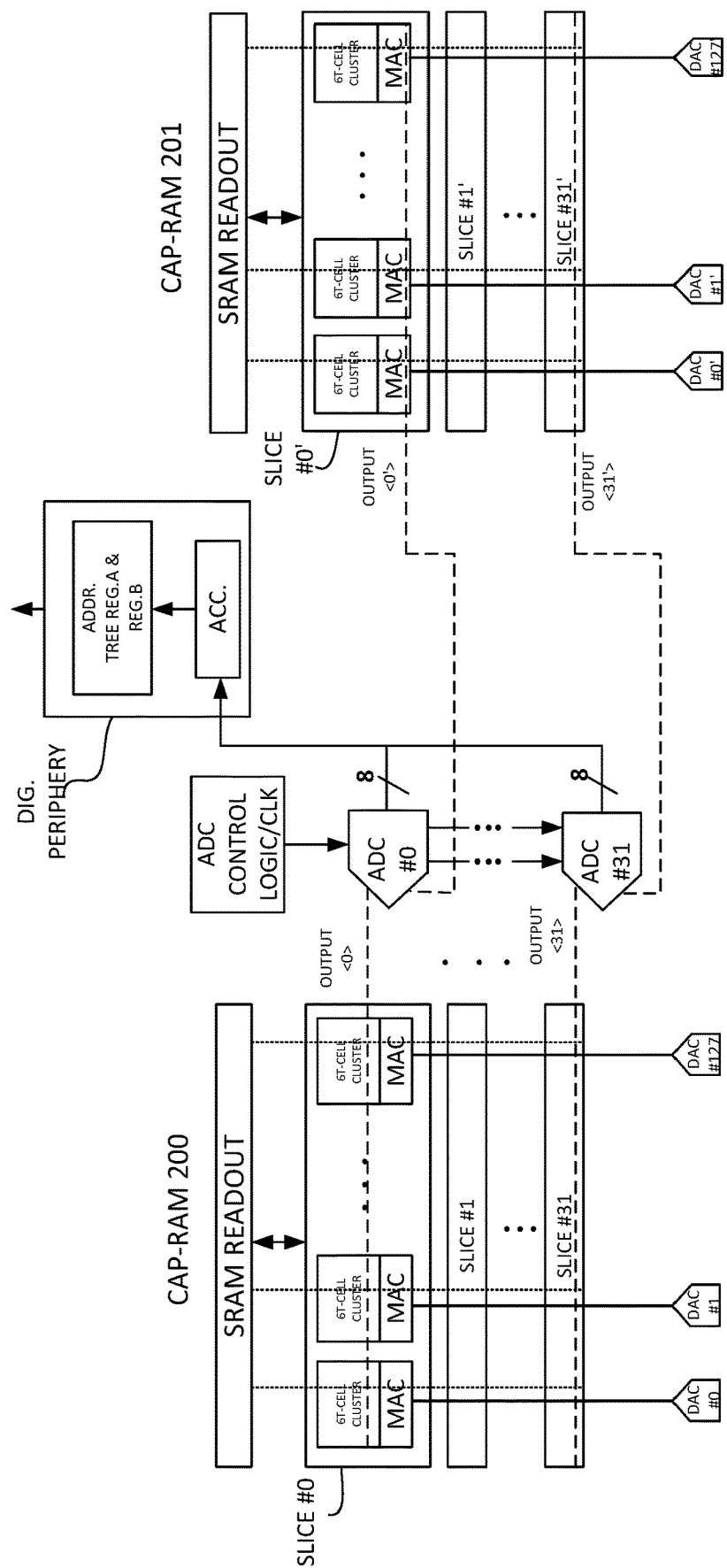
FIG. 2B is a diagram showing functional elements comprising another embodiment with a plurality of ADCs being shared between two CAP-RAM macros.
Figures 3A, 3B:
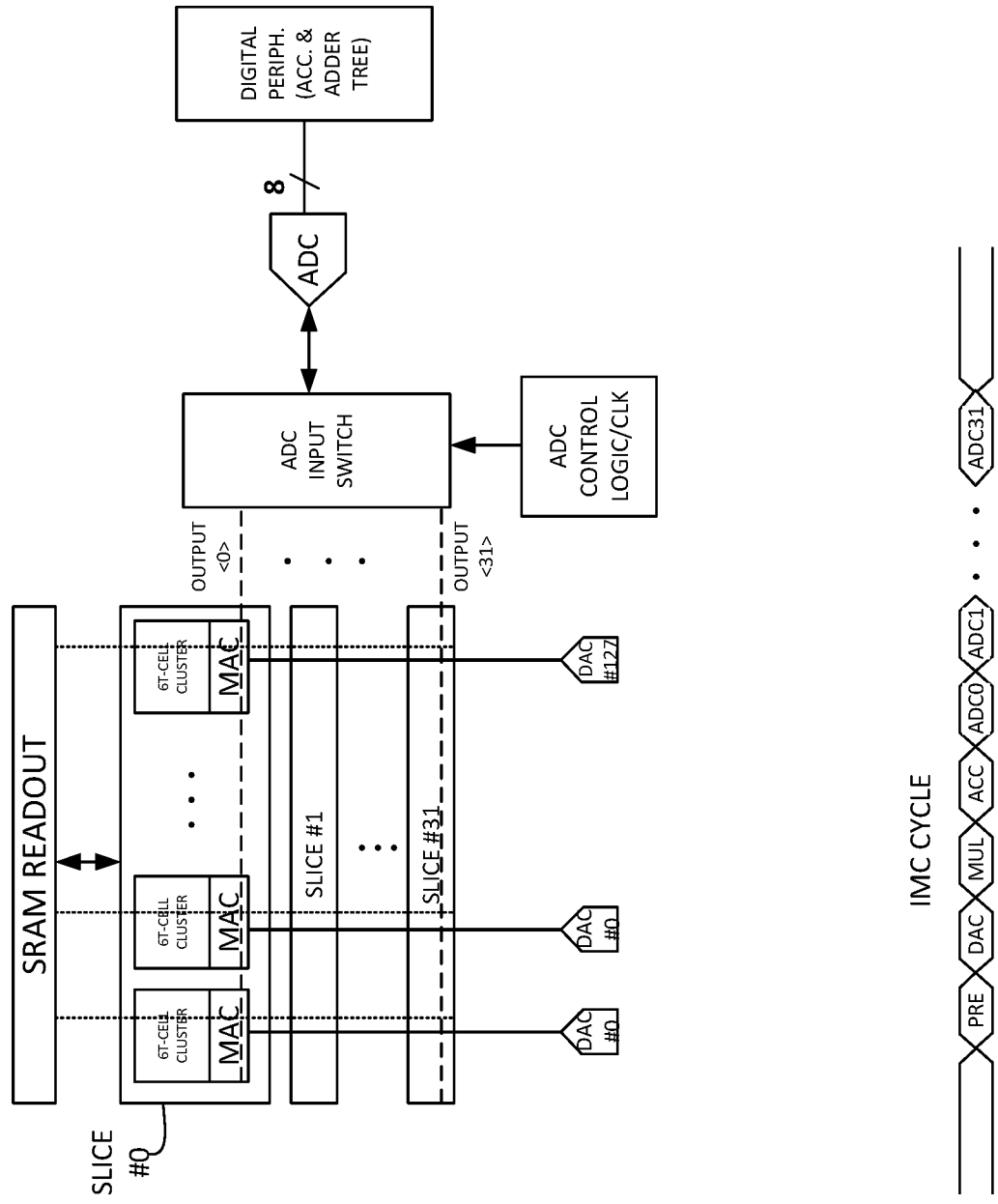
FIG. 3A is a diagram showing functional elements comprising another embodiment having one ADC sampling 6T-Cells comprising a single CAP-RAM macro.
FIG. 3B is a phase diagram of an IMC cycle corresponding to the CAP-RAM circuit in FIG. 3A.

Turning now to FIG. 2B which illustrates another embodiment employing a similar CR and ADC arrangement as that described with reference to FIG. 2A. According to this embodiment, each of the plurality of the ADCs are used in an interleaved manner. During a period of time that each of the ADCs are operating to sample the output line voltages on CR 200, the CR 201 is running an IMC operation. According to this embodiment, both CR 200 and CR 201 are always active (i.e., in a higher-powered state), therefor the overall IMC processing time is reduced. It should be noted that there are two sets of identical adder tree registers labeled REG.A and REG.B implemented in order to run the ADCs in the interleaved mode. Also, while running the ADCs in the interleaved mode, the clock/sampling rate for each ADC would have to double FIG. 3A illustrates another embodiment of a CR circuit 230 similar to the one described earlier with reference to FIG. 2B. However, according to the embodiment illustrated in this Figure, only a single, unshared ADC operates to sample voltages at each of the plurality of output lines, outputs <0> to <31> to the thirty-two rows comprising the CR 230. The operation of the ADC to sample voltages accumulated at each of the outputs is similar to that in FIG. 2B, except that the ADC is not shared between two CRs.

FIG. 3B illustrates phases comprising one IMC cycle that operates in the CR 230 described with reference to FIG. 3A. In this case, the pre-charge, DAC, Multiply, and Accumulator phases are the same as those shown in FIG. 1B, but there is a separate ADC phase included each time the ADC is switched into a different row to sample the voltage level on that row.

Figure 4:
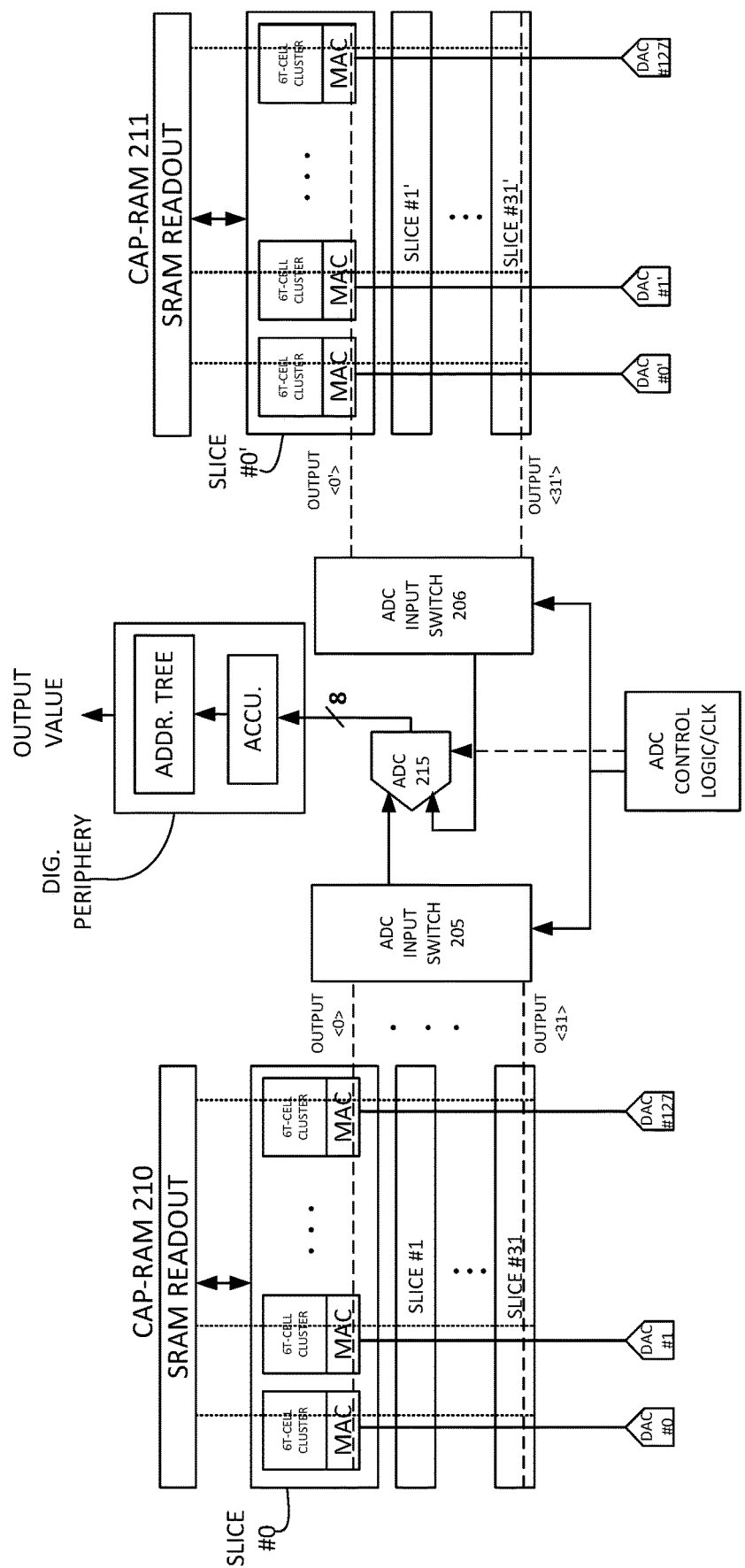
FIG. 4 is a diagram showing an embodiment having one ADC operating to sample 6T-Cells comprising two CAP-RAM macros.

FIG. 4 is a diagram showing an embodiment in which a single ADC is shared between two CRs labeled 210 and 211. According to this embodiment, switches 205 and 206 operate to sequentially connect each of the outputs comprising the CRs 210 and 211 to the first and second inputs of the ADC 215 respectively. The sequential operation of each switch is enabled by the ADC control logic to which they are connected. While an analog switch is used to implement this embodiment, any appropriate single pole multiple throw switch circuit can be used. The output of the ADC is connected, under control of the ADC logic, to the periphery function which has an accumulator and adder tree functionality similar to that described with reference to FIG. 2A. Further, the operation of each ADC in supporting an IMC operation on both CRs is similar to that described with reference to FIG. 2A. This embodiment eliminates the need to implement separate ADC functionality for each row (slice) of 6T-cell clusters comprising a CR. Implementing a CAP-RAM in this manner both lowers the power needed and reduces the area needed to implement the ADC functionality. Also, the size of the periphery functionality can be reduced as both the accumulator and adder tree functionality can be smaller than they would otherwise.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A charge-domain, in-memory computing circuit, comprising:
    an analog-to-digital converter connected by a first switch to a first CAP-RAM macro, and connected by a second switch to a second CAP-RAM macro;
        wherein the switches are controlled to alternately connect the ADC to either the first CR or to the second CR to sample capacitive charge maintained by (each slice) one and then the other of the two CAP-RAMs; and
        wherein, during a first period of time that the ADC is sampling capacitive charge maintained by the first CAP-RAM, the second CAP-RAM performs an in-memory computing (IMC) operation.

2. The CR circuit of claim 1, wherein the first CAP-RAM device has a plurality of slices, and the first switch is controlled to sequentially connect a first input of the ADC to an output of each slice comprising the first CR.

3. The CR circuit of claim 2, wherein the first input of the ADC is a differential input.

4. The CR circuit of claim 1, wherein the second CAP-RAM device has a plurality of slices, and the second switch is controlled to sequentially connect a second input of the ADC to an output of each slice comprising the second CR.

5. The CR circuit of claim 4, wherein the second input of the ADC is a differential input.

6. The CR circuit of claim 1, wherein each of the plurality of slices have one or more clusters of 6T-cells each of which operate to maintain a capacitive charge.

7. The CR circuit of claim 6, wherein each of the one or more 6T-cell clusters is comprised of a plurality of capacitors.

8. A charge-domain in-memory computing circuit (CAP-RAM) comprising:
    a plurality of analog-to-digital converters (ADC), each one of which is connected to first and second CAP-RAM devices;
        wherein a first input of each ADC is connected to one of a plurality of slices comprising the first CAP-RAM device, and a second input of each ADC is connected to one of a plurality of slices comprising the second CAP-RAM device; and wherein during a first period of time that the analog-to-digital converter is sampling capacitive charge maintained by the first CAP-RAM, the second CAP-RAM is available for an in-memory computing (IMC) operation, or;

wherein during a first period of time that the ADC is sampling capacitive charge maintained by the first CAP-RAM, and during this time the second CAP-RAM is in memory retention mode, then during a subsequent period of time the first CAP-RAM is available for an in-memory computing operation.

9. The CR of claim 8, wherein the first and second input to each ADC is a differential input.

10. The CR of claim 8, wherein each of the plurality of slices have one or more clusters of 6T-cells.

11. The CR of claim 8, wherein each of the one or more 6T-cell clusters is comprised of a plurality of capacitors for maintaining a charge sampled by the ADCs.

12. A method of in-memory computing (IMC), comprising:

sampling at a first input to an analog-to-digital converter (ADC) a capacitive charge maintained by a first CAP-RAM connected to the ADC; and sampling at a second input to the ADC a capacitive charge maintained by a second CAP-RAM connected to the ADC;

wherein during a first period of time that the ADC is sampling charge maintained by the first CAP-RAM, the second CAP-RAM is available for an in-memory computing (IMC) operation, or;

wherein during a first period of time that the ADC is sampling charge maintained by the first CAP-RAM, and the second CAP-RAM is in memory retention mode, then the first CAP-RAM is available for an IMC operation during a subsequent period of time.

13. The method of claim 12, wherein the ADC is connected to the first and the second CR by a switch.

14. The method of claim 13, wherein the switch is operated to alternately connect the ADC to the first and the second CR to sample the charge.

15. The method of 12, wherein the first and second inputs to the ADC are differential inputs.

16. The method of 12, wherein each of the first and second CRs have a plurality of slices that operate to maintain a capacitive charge.

17. The method of 16, wherein each slice is comprised an array of capacitors.

* * * * *